(12) United States Patent
Uchikawa

(10) Patent No.: US 7,256,905 B2
(45) Date of Patent: Aug. 14, 2007

(54) COMMUNICATION APPARATUS, COMMUNICATION METHOD AND MEMORY MEDIUM WITH PLURAL DATA TRANSMISSION COMPONENTS

(75) Inventor: Hiroshi Uchikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 09/875,983

(22) Filed: Jun. 8, 2001

(65) Prior Publication Data

US 2002/0010003 A1 Jan. 24, 2002

(30) Foreign Application Priority Data

Jun. 12, 2000 (JP) .............................. 2000-176126
Jun. 12, 2000 (JP) .............................. 2000-176132

(51) Int. Cl.
*G06F 15/00* (2006.01)
*G06F 15/173* (2006.01)
*G06F 13/28* (2006.01)
*H04M 11/00* (2006.01)

(52) U.S. Cl. .................... 358/1.15; 358/1.16; 709/223; 710/26; 379/100.06

(58) Field of Classification Search ............... 358/1.15, 358/1.16, 1.13, 402; 710/26; 715/738, 739; 709/223; 379/100.06
See application file for complete search history.

(56) References Cited

U.S. PATENT DOCUMENTS 6,157,465 A * 12/2000 Suda et al. .................. 358/407
6,438,605 B1 * 8/2002 Idehara ....................... 709/238
6,900,903 B1 * 5/2005 Iida ........................... 358/1.15

FOREIGN PATENT DOCUMENTS

| JP | 04-301962 | 10/1992 |
|---|---|---|
| JP | 10-198626 | 7/1998 |
| JP | 11-252279 | 9/1999 |
| JP | 2000-083232 | 3/2000 |

* cited by examiner

*Primary Examiner*—King Y Poon
*Assistant Examiner*—Thomas J. Lett
(74) *Attorney, Agent, or Firm*—Fitzpatrick, Cella, Harper & Scinto

(57) ABSTRACT

The invention provides a communication apparatus with plural communication functions, which, in case of importing plural address information, judges whether the communication function corresponding to each address information is effective or not and selectively importing only the address information of which the corresponding communication function is effective.

9 Claims, 13 Drawing Sheets

FIG. 4A

ERROR TABLE (FAX)

| LEVEL | STATUS | ERROR |
|---|---|---|
| 1 | FAX DEVICE ABSENT | ○ |
| 2 | FAX DEVICE OUT OF ORDER | ○ |
| 3 | FAX ENVIRONMENT NOT SET | |
| ... | ... | |
| 99 | NORMAL | |

FIG. 4B

ERROR TABLE (DATABASE)

| LEVEL | STATUS | ERROR |
|---|---|---|
| 1 | NETWORK DEVICE ABSENT | ○ |
| 2 | NETWORK DEVICE OUT OF ORDER | ○ |
| 3 | NETWORK ENVIRONMENT NOT SET | |
| ... | ... | |
| 99 | NORMAL | |

FIG. 4C

ERROR TABLE (MAIL/IFAX)

| LEVEL | STATUS | ERROR |
|---|---|---|
| 1 | NETWORK DEVICE ABSENT | ○ |
| 2 | NETWORK DEVICE OUT OF ORDER | ○ |
| 3 | NETWORK ENVIRONMENT NOT SET | |
| 4 | MAIL SERVER NOT SET | |
| ... | ... | |
| 99 | NORMAL | |

FIG. 4D

ERROR TABLE (PRINT)

| LEVEL | STATUS | ERROR |
|---|---|---|
| 1 | NETWORK DEVICE ABSENT | ○ |
| 2 | NETWORK DEVICE OUT OF ORDER | ○ |
| 3 | NETWORK ENVIRONMENT NOT SET | |
| ... | ... | |
| 99 | NORMAL | |

FIG. 5

ADDRESS TABLE

| INDEX ID | NAME | TYPE | ADDRESS |
|---|---|---|---|
| 1 | PRINTER1/XXX INC/JP | PRINT | printer1.xxx.co.jp |
| 2 | PRINTER2/XXX INC/JP | PRINT | printer2.xxx.co.jp |
| 3 | FAX1/XXX INC/JP | FAX | 012-345-6789 |
| 4 | FAX2/XXX INC/JP | FAX | 987-654-3210 |
| 5 | DB1/XXX INC/JP | DATABASE | db1.xxx.co.jp/folder1 |
| 6 | | | |
| 7 | DB3/XXX INC/JP | DATABASE | db3.xxx.co.jp/folder1 |
| 8 | USER1/XXX INC/JP | MAIL | user1@.xxx.co.jp |
| 9 | USER2/XXX INC/JP | MAIL | user2@.xxx.co.jp |
| 10 | USER3/XXX INC/JP | MAIL | user3@.xxx.co.jp |
| 11 | | | |
| 12 | USER5/XXX INC/JP | MAIL | user5@.xxx.co.jp |
| 13 | USER6/XXX INC/JP | MAIL | user6@.xxx.co.jp |
| 14 | USER7/XXX INC/JP | MAIL | user7@.xxx.co.jp |
| 15 | | | |
| 16 | USER9/XXX INC/JP | MAIL | user9@.xxx.co.jp |
| | | | |
| ⋮ | ⋮ | ⋮ | ⋮ |
| | | | |
| 998 | IFAX1/XXX INC/JP | IFAX | ifax1@.xxx.co.jp |
| 999 | | | |
| 1000 | IFAX3/XXX INC/JP | IFAX | ifax3@.xxx.co.jp |

FIG. 11

ADDRESS INFO FOR COMPOSITE APPARATUS 4001

FUNCTIONS SUPPORTED
- FAX
- PRINT
- DATABASE
- MAIL
- IFAX

| NAME | TYPE | ADDRESS |
|---|---|---|
| PRINTER1/XXX INC/JP | PRINT | printer1.xxx.co.jp |
| PRINTER2/XXX INC/JP | PRINT | printer2.xxx.co.jp |
| FAX1/XXX INC/JP | FAX | 012-345-6789 |
| FAX2/XXX INC/JP | FAX | 987-654-3210 |
| DB1/XXX INC/JP | DATABASE | db1.xxx.co.jp/folder1 |
| DB3/XXX INC/JP | DATABASE | db3.xxx.co.jp/folder1 |
| USER1/XXX INC/JP | MAIL | user1@.xxx.co.jp |
| USER2/XXX INC/JP | MAIL | user2@.xxx.co.jp |
| USER3/XXX INC/JP | MAIL | user3@.xxx.co.jp |
| GROUP1/XXX INC/JP | GROUP | fax:FAX1/XXX Inc/JP:012-345-6789<br>mail:USER1/XXX Inc/JP:user1@xxx.co.jp<br>print:PRINTER1/XXX Inc/JP:printer1.xxx.co.jp |
| GROUP2/XXX INC/JP | GROUP | ifax:FAX1/XXX Inc/JP:ifax1@xxx.co.jp<br>database:DB1/XXX Inc/JP:db1@xxx.co.jp/folder1<br>print:PRINTER2/XXX Inc/JP:printer2.xxx.co.jp<br>mail:USER3/XXX Inc/JP:user3@xxx.co.jp |
| ⋮ | ⋮ | ⋮ |
| IFAX1/XXX INC/JP | IFAX | ifax1@.xxx.co.jp |
| IFAX3/XXX INC/JP | IFAX | ifax3@.xxx.co.jp |

⇩ IMPORT

ADDRESS INFO FOR COMPOSITE APPARATUS 4002

FUNCTIONS SUPPORTED
- PRINT
- MAIL
- IFAX

| NAME | TYPE | ADDRESS |
|---|---|---|
| PRINTER1/XXX INC/JP | PRINT | printer1.xxx.co.jp |
| PRINTER2/XXX INC/JP | PRINT | printer2.xxx.co.jp |
| ~~FAX1/XXX INC/JP~~ | ~~FAX~~ | ~~012-345-6789~~ |
| ~~FAX2/XXX INC/JP~~ | ~~FAX~~ | ~~987-654-3210~~ |
| ~~DB1/XXX INC/JP~~ | ~~DATABASE~~ | ~~db1.xxx.co.jp/folder1~~ |
| ~~DB3/XXX INC/JP~~ | ~~DATABASE~~ | ~~db3.xxx.co.jp/folder1~~ |
| USER1/XXX INC/JP | MAIL | user1@.xxx.co.jp |
| USER2/XXX INC/JP | MAIL | user2@.xxx.co.jp |
| USER3/XXX INC/JP | MAIL | user3@.xxx.co.jp |
| GROUP1/XXX INC/JP | GROUP | ~~fax:FAX1/XXX Inc/JP:012-345-6789~~<br>mail:USER1/XXX Inc/JP:user1@xxx.co.jp<br>print:PRINTER1/XXX Inc/JP:printer1.xxx.co.jp |
| GROUP2/XXX INC/JP | GROUP | ifax:FAX1/XXX Inc/JP:ifax1@xxx.co.jp<br>~~database:DB1/XXX Inc/JP:db1@xxx.co.jp/folder1~~<br>print:PRINTER2/XXX Inc/JP:printer2.xxx.co.jp<br>mail:USER3/XXX Inc/JP:user3@xxx.co.jp |
| ⋮ | ⋮ | ⋮ |
| IFAX1/XXX INC/JP | IFAX | ifax1@.xxx.co.jp |
| IFAX3/XXX INC/JP | IFAX | ifax3@.xxx.co.jp |

DELETED

COMMUNICATION APPARATUS, COMMUNICATION METHOD AND MEMORY MEDIUM WITH PLURAL DATA TRANSMISSION COMPONENTS

BACKGROUND OF THE INVENTION

1. Field of the Invention

The present invention relates to a communication apparatus provided with plural devices to be used for execution of plural transmission jobs for transmitting respective data to plural addresses, a communication method and a memory medium therefor.

2. Related Background Art

As a communication apparatus connected to a communication network including various apparatus such as a client computer, a printer, a mail server, a database server etc., there is known an apparatus provided with plural devices to be used for execution of plural transmission jobs for transmitting respective data to plural addresses including the apparatus on the network. Such devices for example includes a device for transmitting data as facsimile transmission information, a device for transmitting data as print data to a printer apparatus, a device for transmitting data as e-mail data to a mail server and a device for transmitting data for constituting database to a database server, and are so constructed as to execute a transmission job for corresponding data transmission to the designated address.

Such communication apparatus is so constructed, in executing the transmission job, as to display a list of addresses registered in advance and to select the address to which the data of the transmission job are to be transmitted, from such displayed list of addresses.

In such conventional communication apparatus, depending on the state of the devices, there may be encountered a situation where a certain transmission job for example the e-mail transmission is executed in normal manner but another transmission job for example the facsimile job is not executed normally. Stated differently, there may be a case where the device for executing the e-mail transmission job functions in normal manner but the device for executing the facsimile transmission job does not function in normal manner.

However, since such communication apparatus is so constructed, in executing the transmission job, as to display the list of the addresses registered in advance and to select the address of transmission from such displayed list of the addresses, even in case for example the device for executing the facsimile transmission job does not function in normal manner, it is still possible to select an address for the facsimile transmission job from the displayed list. If the address for the facsimile transmission job is selected and the facsimile transmission job to the selected address is executed in such state, the facsimile transmission job cannot be executed in normal manner and is terminated by an error.

As explained in the foregoing, the convenience of use is still deficient in that, even in case the transmission job cannot be executed in normal manner, the address for such transmission job can be selected and designated thereby resulting in wasted operation for the user.

Also there is recently proposed a communication apparatus provided with plural different data transmission components. In such apparatus, the address information is managed in each transmission component such as the e-mail transmission component or the facsimile transmission component, and there is also proposed a technology of importing plural address information, utilized in another communication apparatus, to the above-mentioned communication apparatus and utilizing thus imported address information therein.

However, in such conventional configuration, if there is a transmission component not available in the importing communication apparatus, for example in case the transmission component is different in the communication apparatus exporting the information and in that importing the information, there is imported also the address information not usable in the importing communication apparatus.

Also in such case, there may result a transmission error by the erroneous use of such unusable address information by the user.

Also such technology is not easily usable for the use in that the unusable address information has to be manually eliminated one by one in order to prevent such transmission error.

SUMMARY OF THE INVENTION

In consideration of the foregoing, the object of the present invention is to provide a communication apparatus capable of preventing the erroneous use of the unusable address information by the user, a data communication method and a memory medium therefor.

The above-mentioned object can be attained, according to the present invention, by a communication apparatus having at least one data transmission component, including a storage unit adapted to store address information for designating transmission destination; an importing unit adapted to import address information from an external device into the storage unit, and a transmitting unit adapted to transmit data to the transmission destination based on the address information stored in said storage unit, wherein the importing unit imports the address information stored in the external device in a case where the address information corresponds to a type of the at least one data transmission component, and wherein the importing unit does not import the address information stored in the external device in a case where the address information does not correspond to the type of the at least one data transmission component, and a communication system, communication method, computer program and memory medium therefor.

According to the present invention, there is also provided a communication apparatus having a plurality of types of data transmission components, including a storage unit adapted to store address information for designating transmission destination; a display unit adapted to display the address information stored in the storage unit, and a transmitting unit adapted to transmit data to the transmission destination based on the address information stored in the storage unit, wherein the display unit displays the address information to which a type of the data transmission component corresponds in a case where the data transmission component is available, and wherein the display unit does not display the address information to which a type of the data transmission component does not correspond in a case where the data transmission component is not available, and a communication method, computer program and memory medium therefor.

According to the present invention, there is also provided a communication apparatus for transmitting data. The apparatus includes a transmitting unit adapted to transmit data and capable of selectively executing one of a plurality of transmitting operations; a management unit adapted to manage address information for designating a transmission destination which corresponds to any one of the plurality of transmitting operations; an obtaining unit adapted to obtain the transmission destination based on the address information; a control unit adapted to control the transmitting unit so as to transmit data to the transmission destination obtained by the obtaining unit using one of the plurality of transmitting operations corresponding to the transmission destination: and a discriminating unit adapted to discriminate whether each of the plurality of transmitting operations is available or not. The management unit imports the address information, from an external device, corresponding to predetermined transmitting operation in a case where the discriminating unit discriminates that the predetermined transmitting operation is available, and the importing unit does not import the address information from the external device in a case where the discriminating unit discriminates that the predetermined transmitting operation is not available.

According to the present invention, there is also provided a communication apparatus for transmitting data. The apparatus includes a transmitting unit adapted to transmit data and capable of executing one of a plurality of transmitting operations; a management unit adapted to manage address information for designating a transmission destination which corresponds to any one of the plurality of transmitting operations; an obtaining unit adapted to obtain the transmission destination based on the address information; a control unit adapted to control the transmitting unit so as to transmit data to the transmission destination obtained by the obtaining unit using one of the plurality of transmitting operations corresponding to the transmission destination; and a discriminating unit adapted to discriminate whether each of the plurality of transmitting operations is available or not. The obtaining unit allows to obtain predetermined address information stored in a storage unit to which predetermined transmitting operation corresponds in a case where the discriminating unit discriminates that the predetermined operation is available, and the obtaining unit does not allow to obtain the predetermined address information stored in the storage unit to which predetermined transmitting operation corresponds in a case where the discriminating unit discriminates that the predetermined transmitting operation is not available.

Other objects of the present invention and the features thereof will become fully apparent from the following detailed description which is to be taken in conjunction with the accompanying drawings.

BRIEF DESCRIPTION OF THE DRAWINGS

FIGS. 4A, 4B, 4C and 4D are views showing tables describing the abnormality discriminating reference to be used in an address information display process by an address management component 3002 in the first embodiment, shown in FIG. 3;

FIG. 5 is a view showing an address information management table managed by the address management component 3002 of the first embodiment shown in FIG. 3;

FIG. 11 is a view showing an example of data reconstruction of the address management information in case of importation thereof in the second embodiment.

DESCRIPTION OF THE PREFERRED EMBODIMENTS

Now the present invention will be clarified in detail by preferred embodiments thereof, with reference to the accompanying drawings.

First Embodiment

Figure 1:
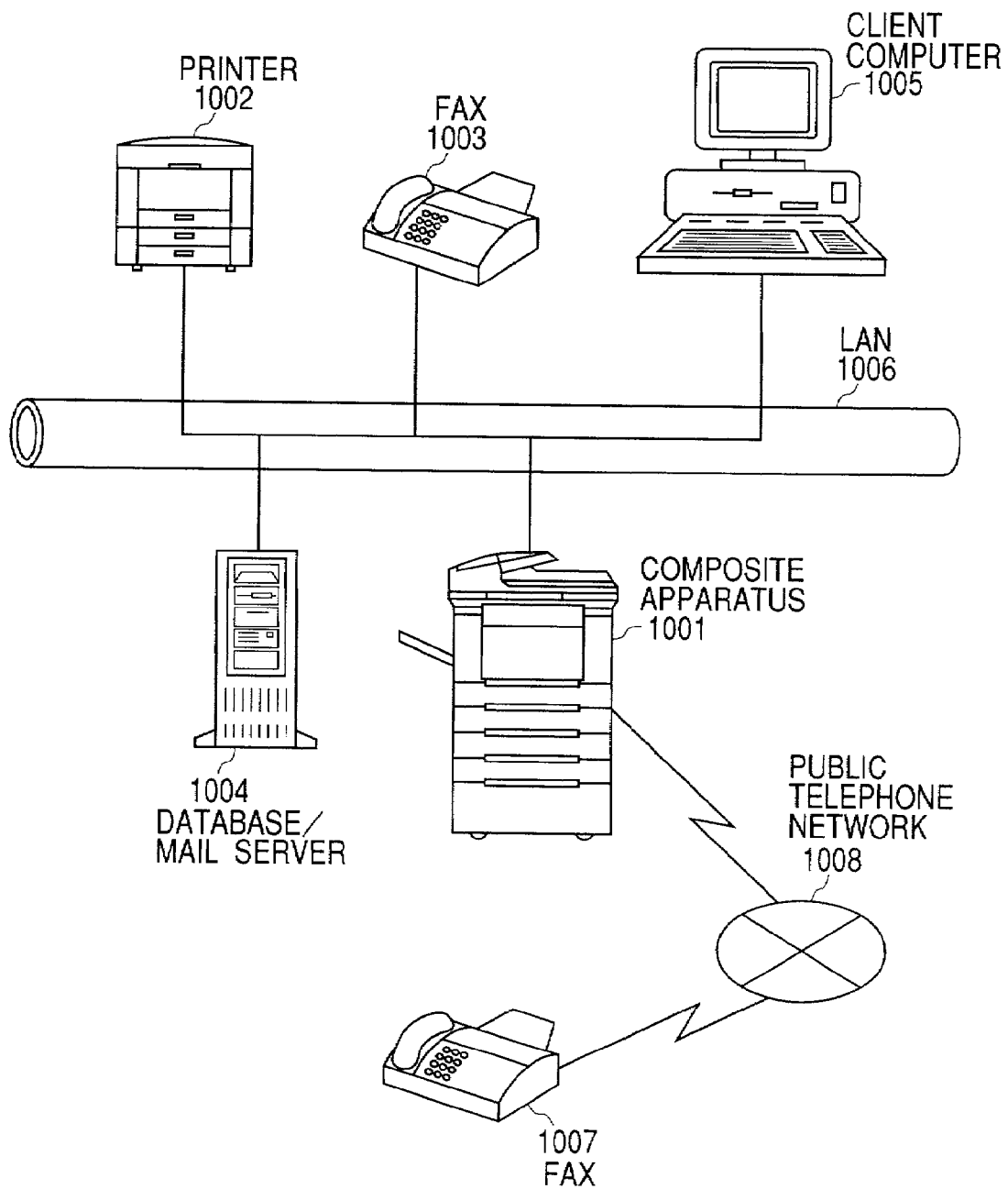
FIG. 1 is a schematic view showing the configuration of a network including a communication apparatus of a first embodiment.

FIG. 1 is a schematic view showing the configuration of a network including a communication apparatus constituting an embodiment of the present invention. In the present embodiment, there will be explained a composite apparatus having a data transmission function.

As shown in FIG. 1, a composite apparatus 1001 is included, together with a printer 1002, a facsimile apparatus 1003, a database/mail server 1004 and a client computer 1005, in a LAN 1006 composed for example of an ethernet. It is also included in a public telephone network together with a facsimile 1007. The composite apparatus 1001 is provided with a copying function, a facsimile function and a data transmission function of reading an original image and transmitting the read image data to the devices on the LAN 1006. The printer 1002 is capable of receiving the data, read by the composite apparatus 1001, through the LAN 1006 and printing the received data. The facsimile 1003 is capable of receiving the data, read by the composite apparatus 1001, through the LAN 1006 and transmitting the received data. The database/mail server 1004 is a server apparatus capable of receiving the data, read by the composite apparatus 1001, through the LAN 1006 and storing the received data as a database or transmitting the received data as an e-mail. The client computer 1005 is connected to the database/mail server 1004 and is capable of obtaining and displaying desired data from the database/mail server 1004 and also capable of receiving the data, read by the composite apparatus 1001, through the LAN 1006 and editing the received data. The facsimile 1007 is capable of receiving the data, read by the composite apparatus 1001, through the public network 1008 and printing the received data.

In the following there will be explained the principal configuration of the composite apparatus 1001 with reference to FIG. 2, which is a block diagram showing the principal configuration of the composite apparatus 1001 shown in FIG. 1.

Figure 2:
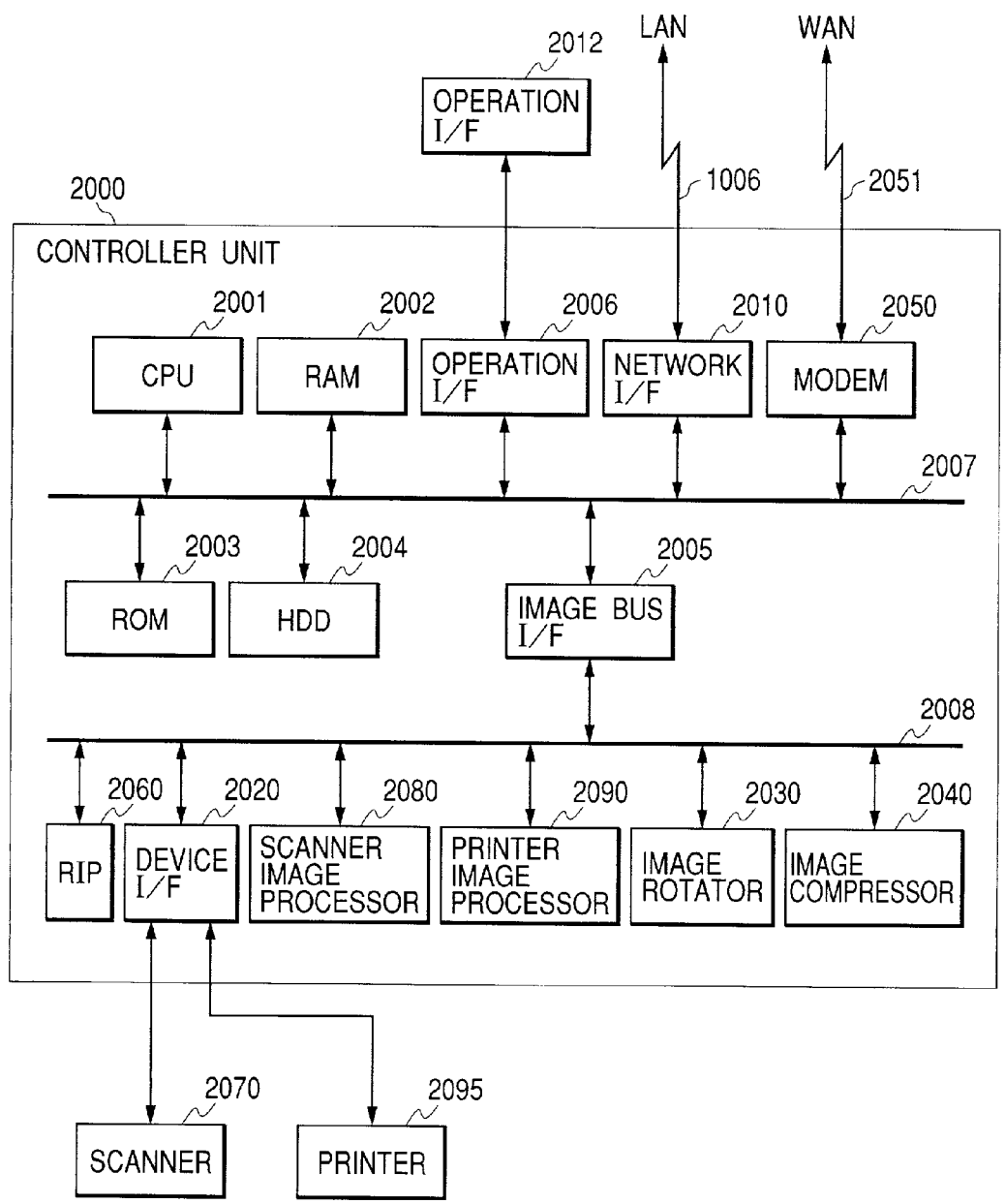
FIG. 2 is a block diagram showing the principal configuration of a composite apparatus 1001 of the first embodiment.

As shown in FIG. 2, the composite apparatus 1001 is provided with a controller unit 2000, which is connected to a scanner 2070 constituting an image input device and a printer 2095 constituting an image output device for executing such control as to realizing the copying function of printing image data, read by the scanner 2070, with the printer 2095 and is also connected to the LAN 1006 and a public network (WAN) 2051 for executing input/output control for the image information and the device information.

More specifically, the controller unit 2000 is provided with a CPU 2001 which activates an operating system (OS) by a boot program stored in a ROM 2003 and executes an application program stored in a hard disk drive (HDD) 2004 on such OS thereby achieving various processes. A RAM 2002 is used as a work area for the CPU 2001 and also has an image memory area for temporarily storing the image data. The HHDD 2004 stores the image data together with the above-mentioned application program.

The CPU 2001 is connected, through a system bus 2007, to the ROM 2003, the RAM 2002, an operation unit I/F (interface) 2006, a network I/F 2010, a modem 2050 and an image bus I/F 2005.

The operation unit I/F 2006 is an interface with an operation unit 2012 provided with a touch panel, and outputs image data to be displayed on the operation unit 2012 thereto. Also the operation unit I/F 2006 transmits information entered by the user in the operation unit 2012 to the CPU 2001.

The network I/F 2010 is connected to the LAN 1006 and executes information exchange with the devices on the LAN 1006, through the LAN 1006. The modem 2050 is connected to the public network 2051 and executes information exchange therethrough.

The image bus I/F 2005 is a bus bridge for connecting, with data structure conversion, the system bus 2007 with an image bus 2008 capable of high speed transmission of the image data. The image bus 2008 is composed of a PCI bus or IEEE1394. On the image bus 2008, there are provided a raster image processor (hereinafter represented as RIP) 2060, a device I/F 2020, a scanner image processing unit 2080, a printer image processing unit 2090, an image rotation unit 2030 and an image compression unit 2040. The RIP 2060 is a processor for developing PDL codes into a bit map image. The device I/F 2020 is connected to the scanner 2070 and the printer 2095 and executes synchronous/asynchronous conversion of the image data. The scanner image processing unit 2080 executes correction, working and editing on the input image data. The printer image processing unit 2090 executes printer correction and conversion of resolution on the print output image data. The image rotation unit 2030 executes rotation of the image data. The image compression unit 2040 executes compression of multi-value image into JPEG data and binary image data into JBIG, MMR or MH data and also executes expansion of such compressed data.

Figure 3:
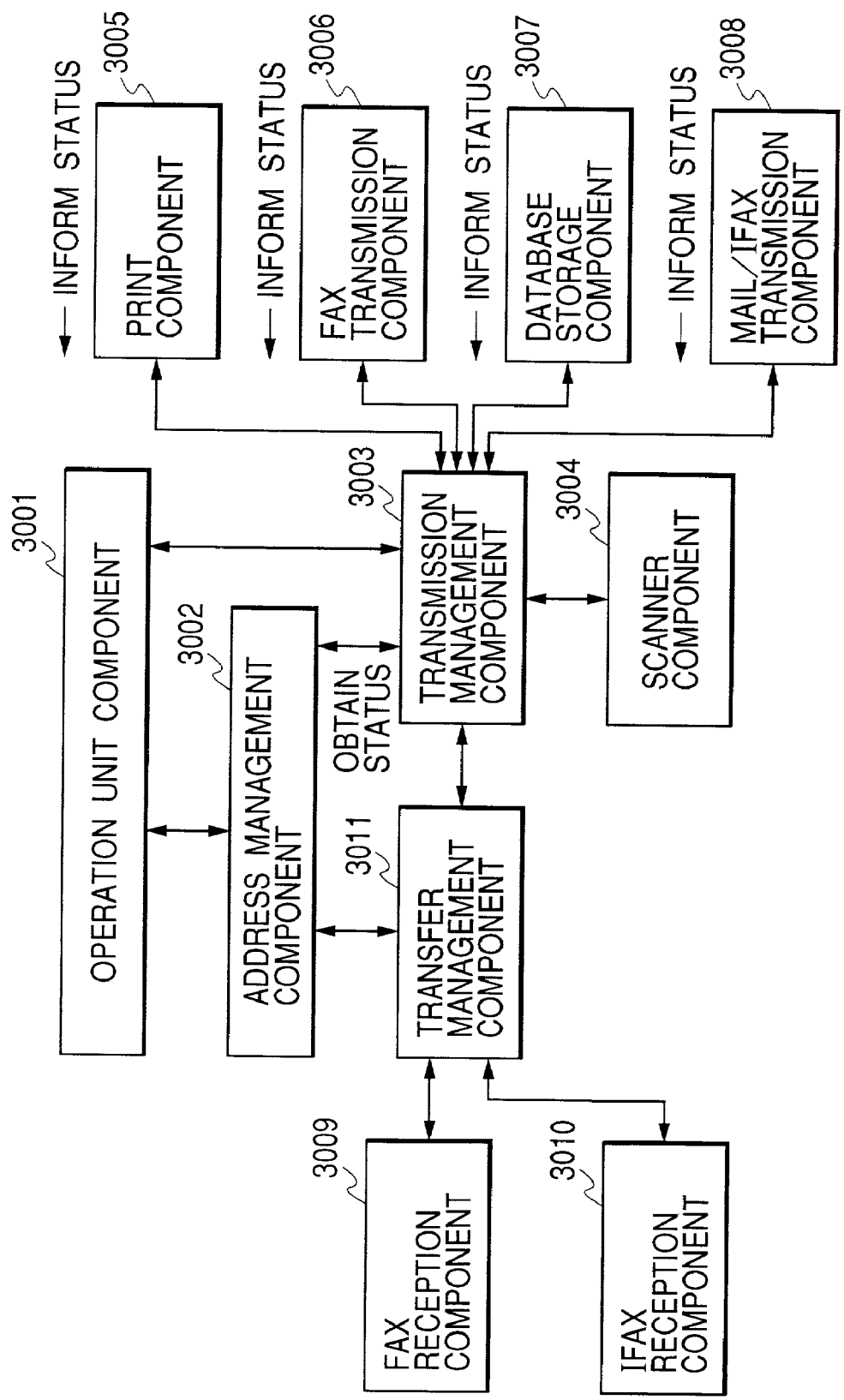
FIG. 3 is a functional block diagram showing the software configuration for realizing the data transmission function of the composite apparatus 1001 of the first embodiment shown in FIG. 1.

In the following there will be explained the data transmission function of the composite apparatus 1001 with reference to FIGS. 3 and 5. FIG. 3 is a function block diagram showing the software configuration for realizing the data transmission function of the composite apparatus 1001 shown in FIG. 1, and FIG. 5 is a view showing an address information management table managed by an address management component 3002 shown in FIG. 3.

The data transmission function of the composite apparatus 1001 is realized by the execution of an application program stored in the HDD 2004, and the functional blocks of thus realized data transmission function include, as shown in FIG. 3, an operation unit component 3001, an address management component 3002, a transmission management component 3003 and a transfer management component 3011.

The address management component 3002 holds and manages a management table describing address information indicating for example an address (device on the LAN 1006) to which data are to be transmitted through the network I/F 2010 and an address (device on the public network) to which data are to be transmitted through the modem 2050. More specifically, the management table is rewritable by the user input through the operation unit 2012, and is stored in the HDD 2004. As shown in FIG. 5, the management table describes a management number (index ID), an address name (name), transmission means (type) and a transmission address (address). The transmission means (type) in the table indicates the attribute of the transmission job, and, in the present embodiment, "fax" indicates a facsimile job, "print" indicates a print job, "database" indicates a database job and "mail" or "ifax" indicates an e-mail/I-facsimile job.

The address management component 3002 executes, as will be explained later, an address information display process of obtaining a necessary device state necessary for the transmission job from the transmission management component 3003 and setting addresses of which display is permitted on the address display list. The details of such address information display process will be explained later.

The operation unit component 3001 obtains the address information from the address management component 3002 and displays the obtained address information on the operation unit 2012. In case of display the address list, there are only displayed addresses for which the display is permitted.

The transmission management component 3003 is connected to a scanner component 3004, a print component 3005, a facsimile transmission component 3006, a database storage component 3007, and a mail/I-fax transmission component 3008. The scanner component 3004 is a functional block for controlling the function of the scanner 2070 based on a process command issued from the transmission management component 3003.

The facsimile transmission component 3006 is a functional block for controlling the data transmitting operation through the modem 2050 based on a process command from the transmission management component 3003 and detecting the state of the modem 2050 and informing the transmission management component 3003 of the result of detection. The print component 3005 is a functional block for controlling the data transmitting operation to the printer 1002 through the network I/F 2010 based on a process command from the transmission management component 3003, and also detecting the device state necessary for the printer job (state of the network I/F 2010, environment set state for the network (LAN 1006)) and informing the transmission management component 3003 of the result of such detection. The database storage component 3007 is a functional block for controlling the data transmitting operation to the database/mail server 1004 through the network I/F 2010 based on a process command from the transmission management component 3003, and also detecting the device state necessary for the database job (state of the network I/F 2010, environment set state for the network (LAN 1006)) and informing the transmission management component 3003 of the result of such detection. The mail/I-fax transmission component 3008 is a functional block for controlling the data transmitting operation to the database/mail server 1004 through the network I/F 2010 based on a process command from the transmission management component 3003, and also detecting the device state necessary for the e-mail/I-fax job (state of the network I/F 2010, environment set state for the network (LAN 1006)) and informing the transmission management component 3003 of the result of such detection. In this manner, the states of the components 3005 to 3008 are informed to the transmission management component 3003 in response to changes in the device states required for the respective transmission jobs.

The transmission management component 3003 collectively manages the informed devices states necessary for the respective transmission jobs, and issues a process command to each of the components based on the address information selected in the operation unit component 3001, thereby controlling the operation of each component. For example, if an address for a facsimile job is selected in the operation unit component 3001, the transmission management component 3003 issues a process command to the scanner component 3004 so as to read an original image, and also issues a process command to the facsimile transmission component 3006 so as to execute facsimile transmission of the read image data to the selected address, whereby the image data read by the scanner 2070 can be transmitted to the facsimile 1003 and the facsimile 1007. Also if an address of a print job, a database job or an e-mail/I-fax job is selected in the operation unit component 3001, a process command is issued to the print component 3005, the database storage component 3007 or the mail/I-fax transmission component 3008, whereby the image data read by the scanner 2070 can be transmitted from the print component 3005, the database storage component 3007 or the mail/I-fax transmission component 3008 to the printer 1002 or the database/mail server 1004.

Also the facsimile image or the I-fax image transmitted from the facsimile 1003 or the client computer 1005 is respectively received by a facsimile reception component 3009 or an I-fax reception component 3010 through the network I/F 2010, and the received facsimile image or I-fax image is transferred by the transfer management component 3011 to the transmission management component 3003 based on the information of the address management component 3002.

Also the facsimile image transmitted from the facsimile 3007 is receives by a facsimile reception component 3009 through the modem 2050, and the received facsimile image is transferred by the transfer management component 3011 to the transmission management component 3003 based on the information of the address management component 3002.

Figure 6A:
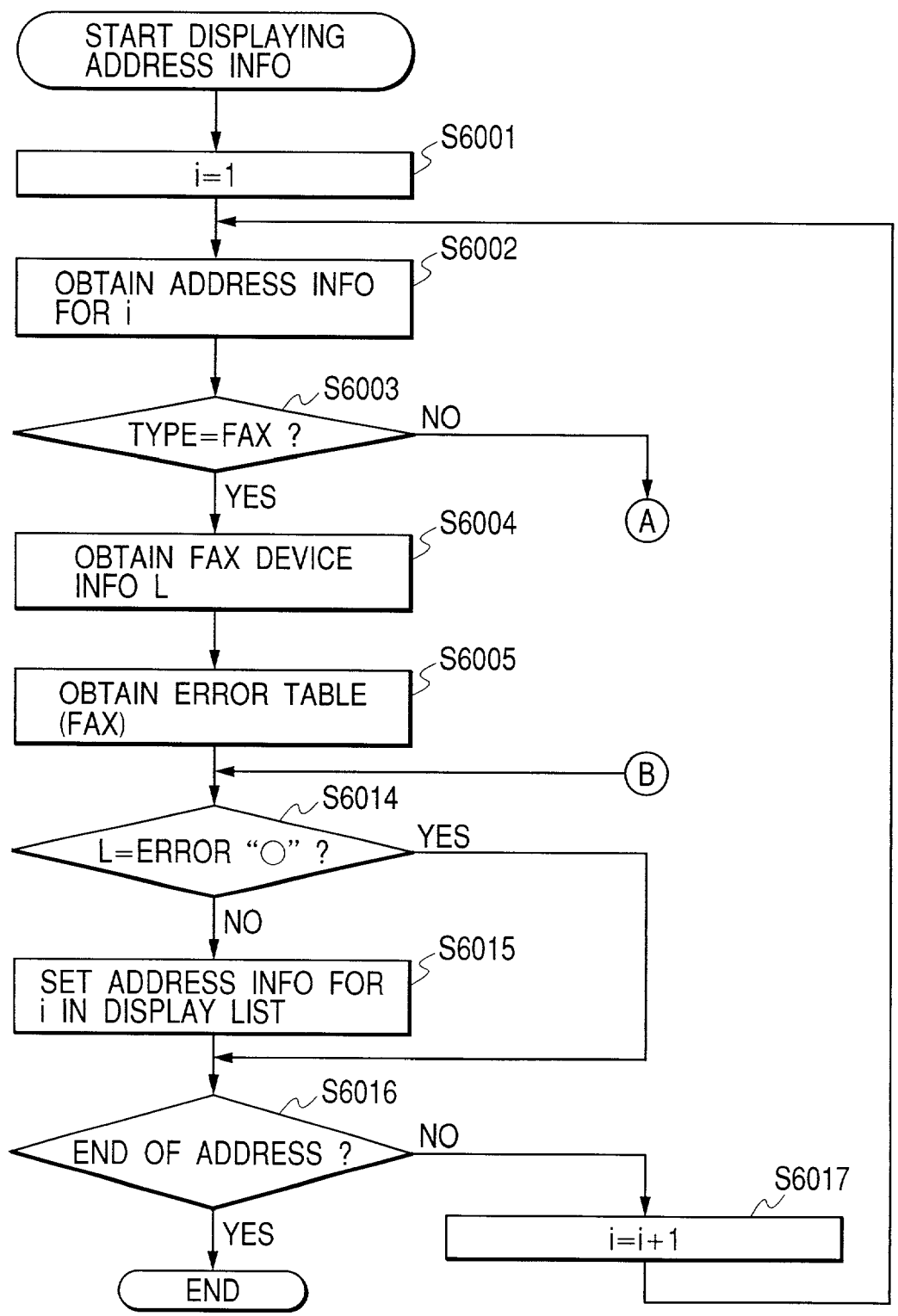
FIGS. 6A and 6B are flow charts showing the address information display process by the address management component 3002 of the first embodiment shown in FIG. 3.
Figure 6B:
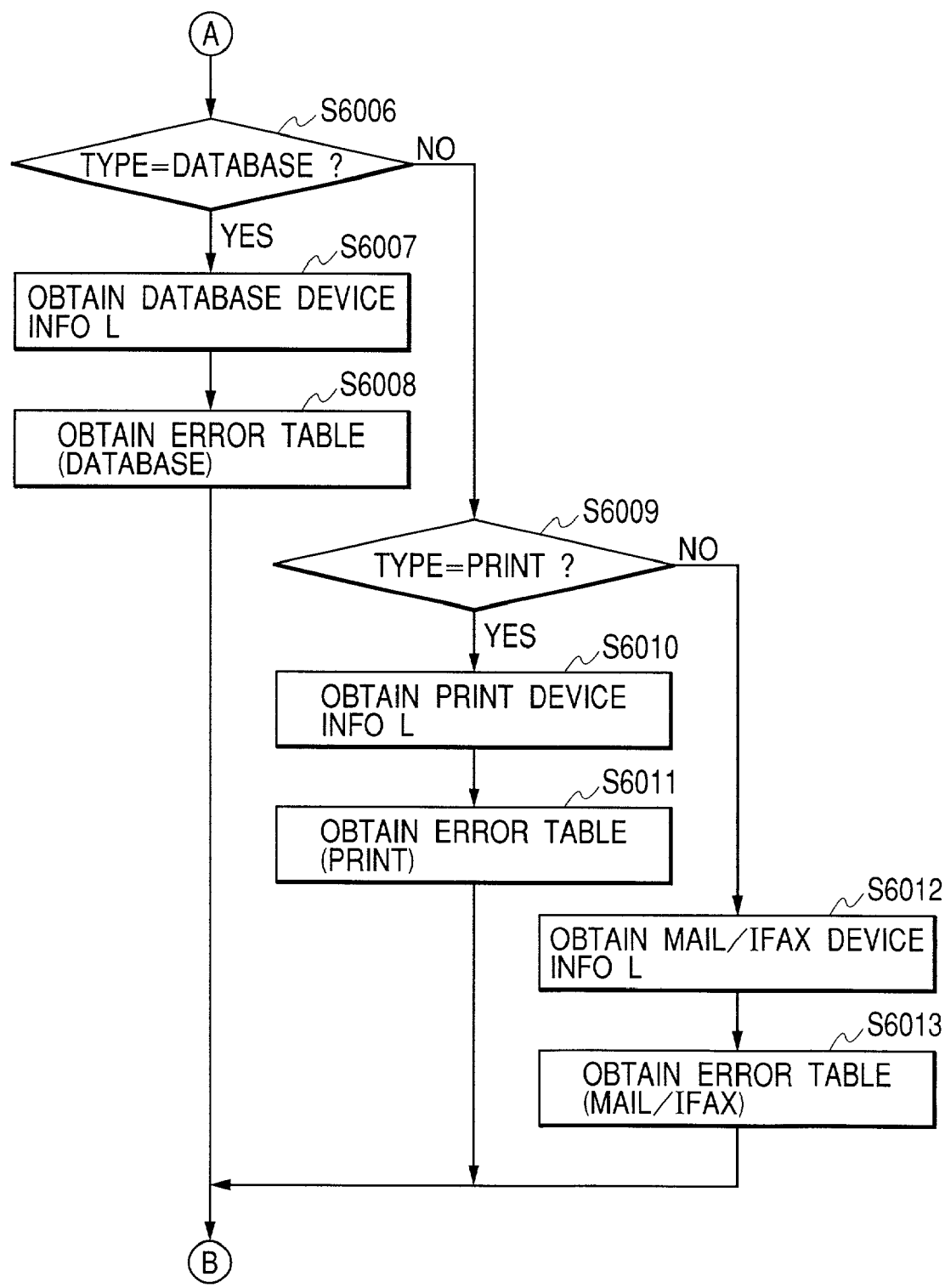

In the following there will be explained an address information display process by the address management component 3002, with reference to FIGS. 4A to 4D and 6A and 6B. FIGS. 4A to 4D show tables describing the abnormality discriminating references to be used in the address information display process by the address management component 3002 shown in FIG. 3, and FIGS. 6A and 6B are flow charts showing the address information display process by the address management component 3002 shown in FIG. 3.

The address information display process by the address management component 3002 discriminates whether the state of each device, detected by the components 3005 to 3008, is normal by referring to the abnormality discriminating reference tables (FIGS. 4A to 4D), then extracts the address information for the transmission job to be executed by the device discriminated as normal by referring to the aforementioned management table (FIG. 5), and displays a list of the extracted address information only on the operation unit 2012.

As shown in FIGS. 4A to 4D, the abnormality discrimination reference table to be employed in the address information display process is provided for each of the transmission jobs, namely the facsimile job, the database job, the e-mail/I-fax job and the print job, and the table describes a state assigned for each abnormality level of the device required for the execution of the transmission job and a reference for discriminating whether each level is identified normal or abnormal. A smaller value of the level indicates higher abnormality, and plural states may be assigned to a level. The device states in the table can be detected by the aforementioned components 3005 to 3008.

More specifically, for example in the table of the facsimile job shown in FIG. 4A, a state of absence of the facsimile device (for example absence of the modem 2050) is assigned to the level 1, and a mark "O" is given to the error column for such device state. Based on such mark "O", the state of absence of the facsimile device is discriminated as abnormal. On the other hand, a state that the facsimile environment is not set is assigned to the level 3, and the mark "O" is not given to the error column for such device state, indicating that such state is not abnormal, namely normal. Also in the table of the database job shown in FIG. 4B, a state of absence of the network device (for example absence of the network I/F 2010) is assigned to the level 1, and a mark "O" is given to the error column for such device state. Based on such mark "O", the state of absence of the network device is discriminated as abnormal.

In this manner, each state is discriminated as abnormal or not according to the presence or absence of the mark "O" in the error column. The aforementioned tables of the transmission jobs are managed by the address management component 3002 and are stored in the HDD 2004. The content of the table of each transmission job may be fixed in advance and not alterable. Also the number of states discriminated as abnormal is not limited and may be selected arbitrarily. Also the mark "O" in the error column may be made changeable in response to the input operation of the user, and no marks "O" are given in case an address is to be displayed regardless of the state of the device to be used for transmission to such address.

In the following there will be explained the procedure of address information display process by the address management component 3002, with reference to FIGS. 6A and 6B.

When the user executes an input operation for designating the display of the list of the address information on the operation unit 2012, a request for the display of the list of the address information is entered into the address management component 3002, whereby the address information display process is initiated. In this process, as shown in FIG. 6A, a step S6001 at first executes an initialization process for initializing the management number of the address information management table to 1. Then a step S6002 obtains the address information corresponding to a management number i. Then a step S6003 discriminates whether the transmission means (type) for the address information of the management number i is a facsimile.

If the transmission means (type) for the address information of the management number i is a facsimile, the sequence proceeds to a step S6004 to obtain the fax device information L (device state detected by the facsimile transmission component 3006) from the transmission management component 3003, and then a step S6005 obtains the abnormality discrimination reference table of the facsimile job (shown in FIG. 4A). Then the sequence proceeds to a step S6014 to discriminate whether the obtained device information L is abnormal, referring to the abnormality discrimination reference table of the facsimile job. More specifically, there is judged whether the mark "O" is attached to the state indicated by the device information L, and the obtained device information L is judged not abnormal if the mark "O" is absent. If the obtained device information L is judged not abnormal, the sequence proceeds to a step S6015 to set the address information corresponding to the management number i as the address information to be displayed on the list of the address information, and the sequence then proceeds to a step S6016. On the other hand, if the obtained device information L is judged abnormal, the sequence skips the step S6015 and proceeds to the step S6016.

A step S6016 discriminates whether an unprocessed address is present. If present, the sequence proceeds to a step S6017 to add 1 to the management number i and then returns to the aforementioned step S6002 to execute the process for a next address.

If the aforementioned step S6003 identifies that the transmission means (type) for the address information of the management number i is not a facsimile, the sequence proceeds to a step S6006 shown in FIG. 6B for discriminating whether the transmission means (type) for the address information of the management number i is a database. If so, the sequence proceeds to a step S6007 to obtain the device information L (device state detected by the database storage component 3007) from the transmission management component 3003, and then a step S6008 obtains the abnormality discrimination reference table of the database job (shown in FIG. 4B). Then the sequence proceeds to the step S6014 shown in FIG. 6A to discriminate whether the obtained device information L is abnormal, referring to the abnormality discrimination reference table of the database job. More specifically, there is judged whether the mark "O" is attached to the state indicated by the device information L, and the obtained device information L is judged not abnormal if the mark "O" is absent. If the obtained device information L is judged not abnormal, the sequence proceeds to the step S6015 to set the address information corresponding to the management number i as the address information to be displayed on the list of the address information, and the sequence then proceeds to the step S6016. On the other hand, if the obtained device information L is judged abnormal, the sequence skips the step S6015 and proceeds to the step S6016. The step S6016 discriminates whether an unprocessed address is present. If present, the sequence proceeds to the step S6017 to add 1 to the management number i and then returns to the aforementioned step S6002 to execute the process for a next address.

If the aforementioned step S6006 identifies that the transmission means (type) for the address information of the management number i is not a database, the sequence proceeds to a step S6009 for discriminating whether the transmission means (type) for the address information of the management number i is a print. If so, the sequence proceeds to a step S6010 to obtain the data device information L (device state detected by the print component 3005) from the transmission management component 3003, and then a step S6011 obtains the abnormality discrimination reference table of the print job (shown in FIG. 4D). Then the sequence proceeds to the step S6014 shown in FIG. 6A to discriminate whether the obtained device information L is abnormal, referring to the abnormality discrimination reference table of the print job. More specifically, there is judged whether the mark "O" is attached to the state indicated by the device information L, and the obtained device information L is judged not abnormal if the mark "O" is absent. If the obtained device information L is judged not abnormal, the sequence proceeds to the step S6015 to set the address information corresponding to the management number i as the address information to be displayed on the list of the address information, and the sequence then proceeds to the step S6016. On the other hand, if the obtained device information L is judged abnormal, the sequence skips the step S6015 and proceeds to the step S6016. The step S6016 discriminates whether an unprocessed address is present. If present, the sequence proceeds to the step S6017 to add 1 to the management number i and then returns to the aforementioned step S6002 to execute the process for a next address.

If the aforementioned step S6009 identifies that the transmission means (type) for the address information of the management number i is not a print, the transmission means (type) for the address information of the management number i is judged as mail/ifax and the sequence proceeds to a step S6012 for to obtain the data device information L (device state detected by the mail/I-fax component 3008) from the transmission management component 3003, and then a step S6013 obtains the abnormality discrimination reference table of the e-mail/I-fax job (shown in FIG. 4C). Then the sequence proceeds to the step S6014 shown in FIG. 6A to discriminate whether the obtained device information L is abnormal, referring to the abnormality discrimination reference table of the e-mail/I-fax job. More specifically, there is judged whether the mark "O" is attached to the state indicated by the device information L, and the obtained device information L is judged not abnormal if the mark "O" is absent. If the obtained device information L is judged not abnormal, the sequence proceeds to the step S6015 to set the address information corresponding to the management number i as the address information to be displayed on the list of the address information, and the sequence then proceeds to the step S6016. On the other hand, if the obtained device information L is judged abnormal, the sequence skips the step S6015 and proceeds to the step S6016. The step S6016 discriminates whether an unprocessed address is present. If present, the sequence proceeds to the step S6017 to add 1 to the management number i and then returns to the aforementioned step S6002 to execute the process for a next address.

In the first embodiment, as explained in the foregoing, there is determined whether address information of each management number i is to be set in the list of the address information according to the state of the device necessary for the execution of the transmission job corresponding to the address information, so that the list of the address information displayed on the operation unit 2012 does not contain the address of the transmission job that cannot be executed in normal manner, whereby the user can be prevented from executing unnecessary operations such as selection and designation of the address of the transmission job that cannot be executed in normal manner. Also in case the transmission jobs include the original reading operation by the scanner 2070, there can be prevented a drawback that the apparatus is occupied by the execution of the transmission job which results in an error. Therefore the user can be given high convenience of use.

Also it is possible to eliminate the mark "O" in all the error columns in the abnormality discrimination reference table of each transmission job, by rendering such mark as alterable according to the input operation of the user as explained in the foregoing. It is thus possible to always display an address regardless of the state of the device to be used for the transmission to such address.

Also, through the process of selecting and designating desired address information from the displayed list of the address information and of identifying and executing the transmission job corresponding to thus designated address information, the designation of the address information enables the execution of the corresponding transmission job to such address, whereby the operations for executing the transmission job can be simplified.

Second Embodiment

In the following there will be explained a second embodiment of the present invention.

FIGS. 1, 2 and 3 employed in the description of the first embodiment are also applicable to the second embodiment.

Figure 7:
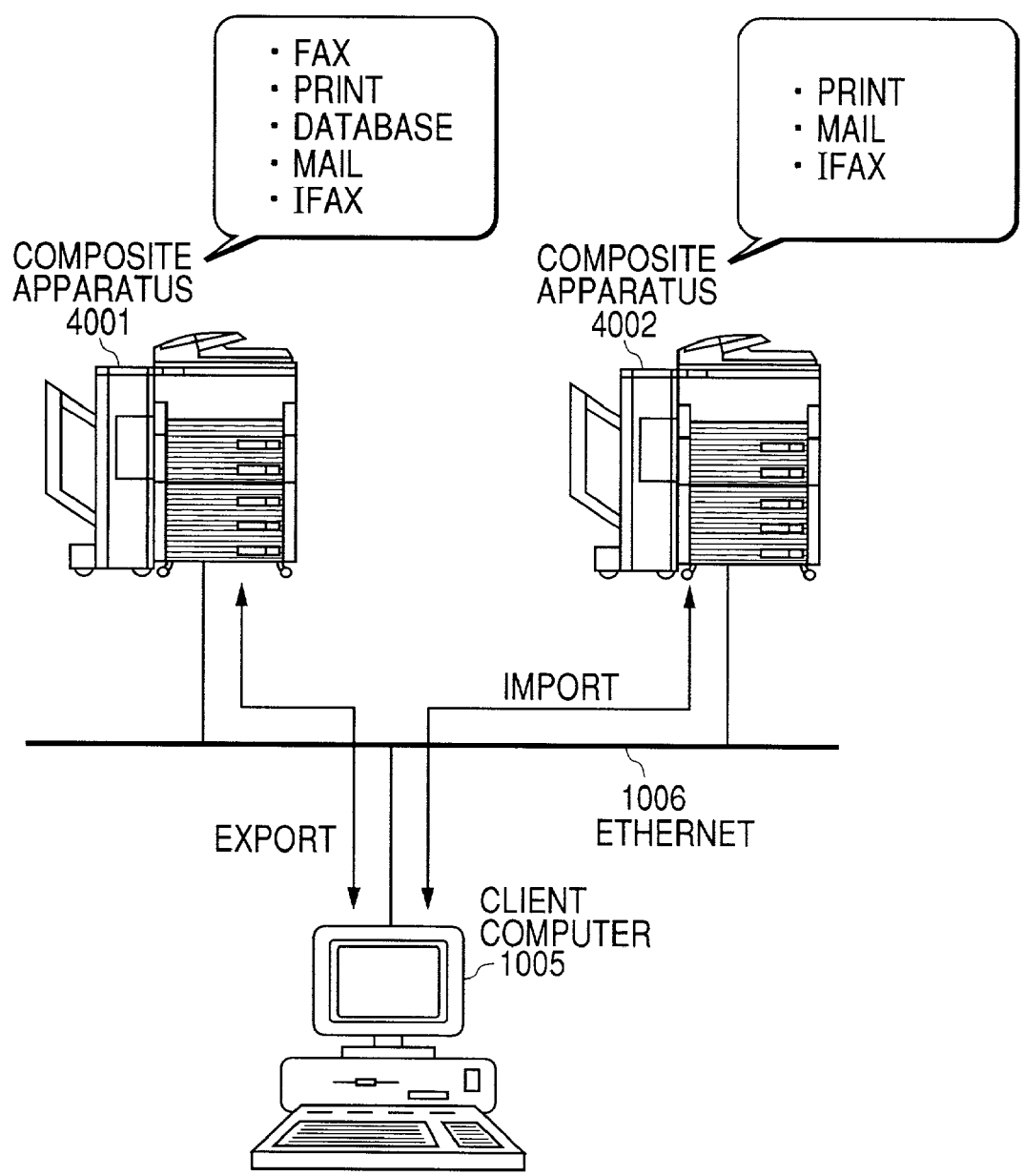
FIG. 7 is a view showing examples of apparatus exporting and importing the address management information in a second embodiment.

FIG. 7 shows an example of the configuration for exporting the address management information from a composite apparatus 4001 and importing such information to a composite apparatus 4002.

In the illustrated example, the client computer 1005 makes access, utilizing the ethernet 1006, to the composite apparatus 4001 to export the address management information therefrom, which is then imported into the composite apparatus 4002 from the client computer 1005, but there may also be employed a configuration in which the composite apparatus 4002 directly obtained the address management information from the composite apparatus 4001.

In the above-described configuration, there may be employed any connection medium capable of bidirectional communication, and the protocol to be used for the data exchange on such connection medium among the composite apparatuses 4001, 4002 and the client computer 1005 can be a known protocol capable of data transfer such as HTTP (hyper text transfer protocol) or FTP (file transfer protocol).

Figure 8:
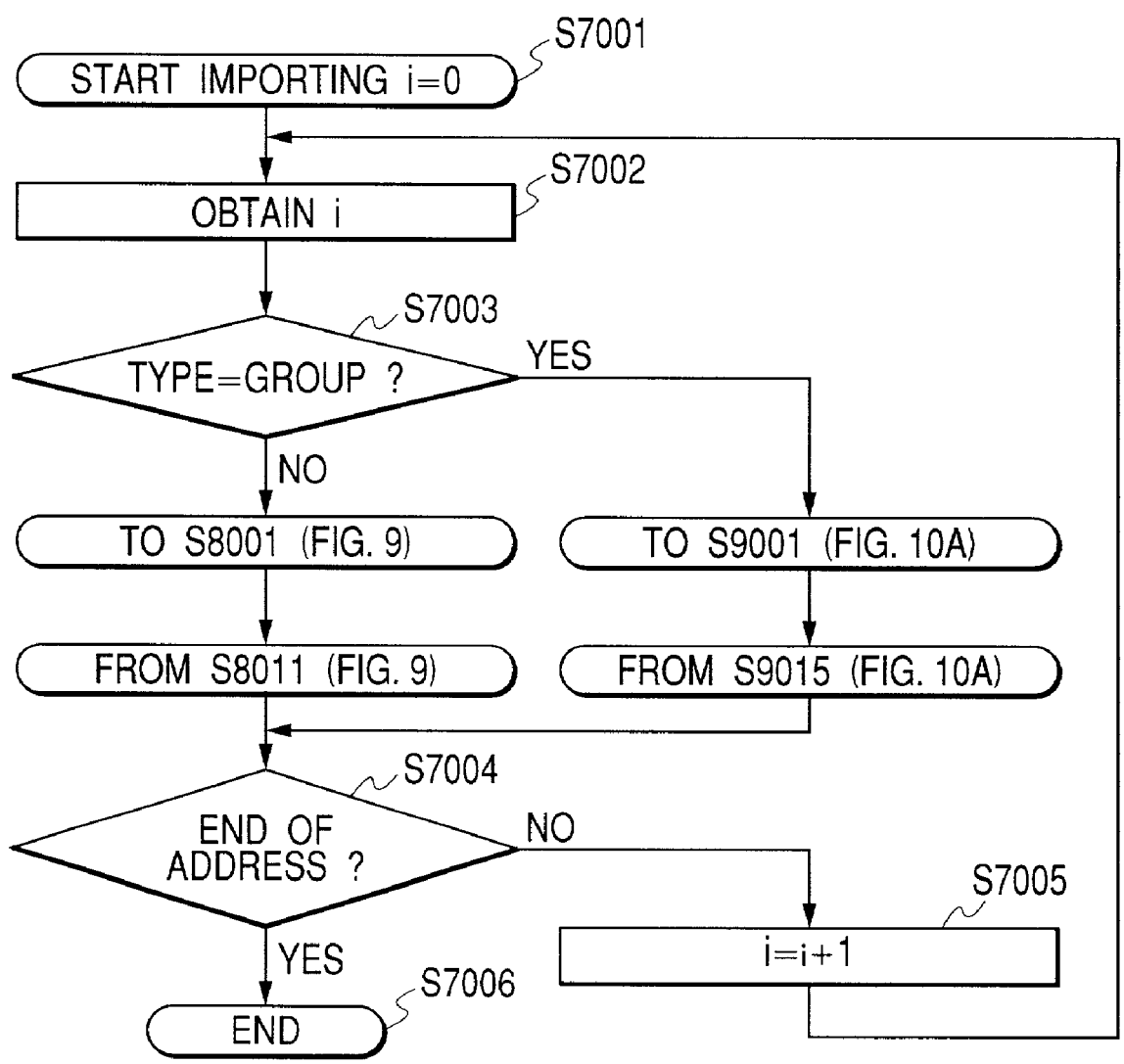
FIG. 8 is a flow chart showing an importing process for the address management information in the second embodiment.

FIG. 8 is a flow chart showing the importing process by the address management component 3002 of the composite apparatus 4002 in case the address management information obtained by exporting from the composite apparatus 4001 is imported to the composite apparatus 4002.

In case importation is instructed from the client computer 1005, the address management component 3002 of the composite apparatus 4002 initiates the importing process by setting the address i=0 in a step S7001, and obtains the address i in a step S7002.

Figure 9:
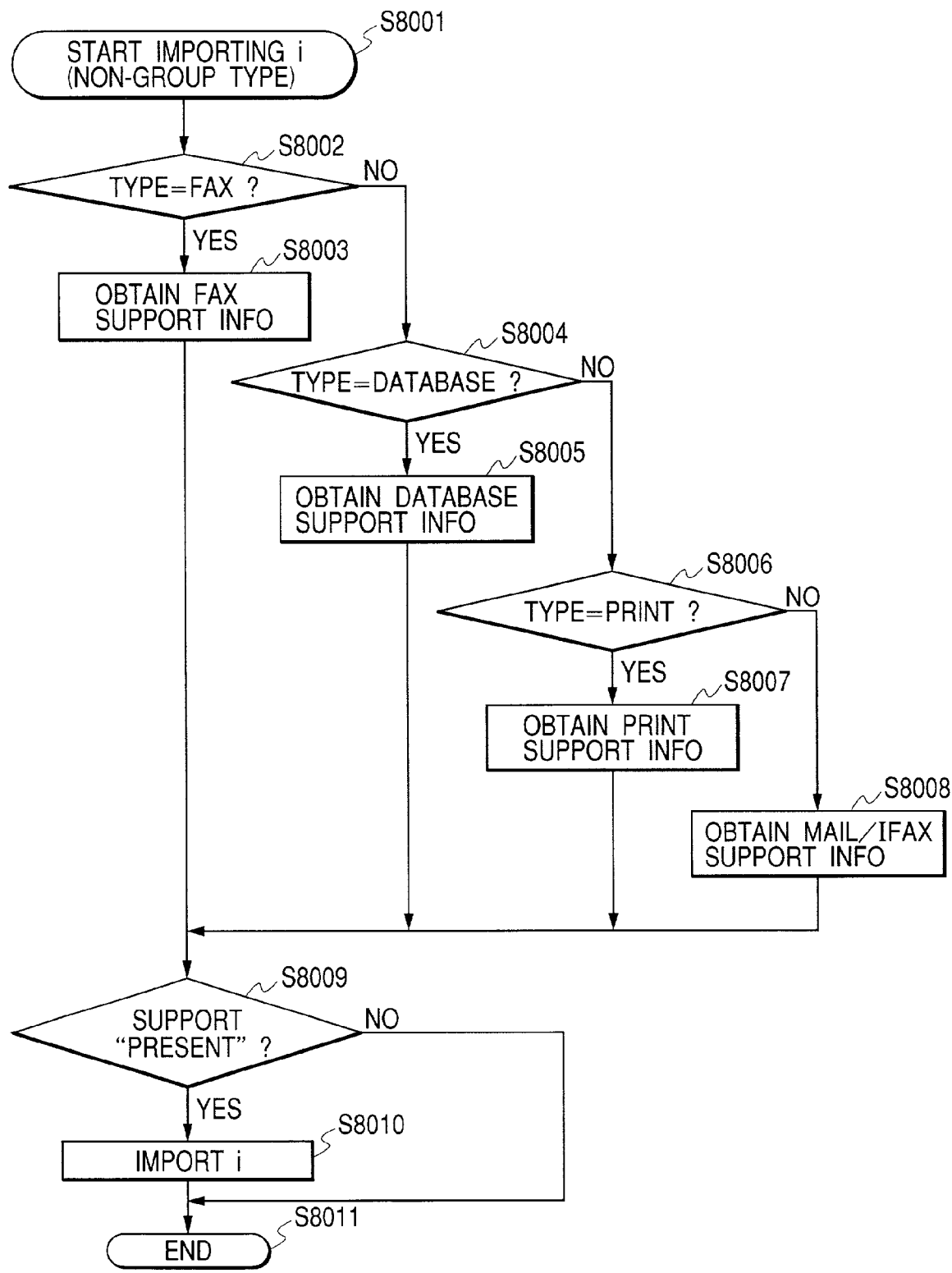
FIG. 9 is a flow chart showing an importing process in the second embodiment, in case the address information to be subjected to the importing process is not a group.
Figure 10A:
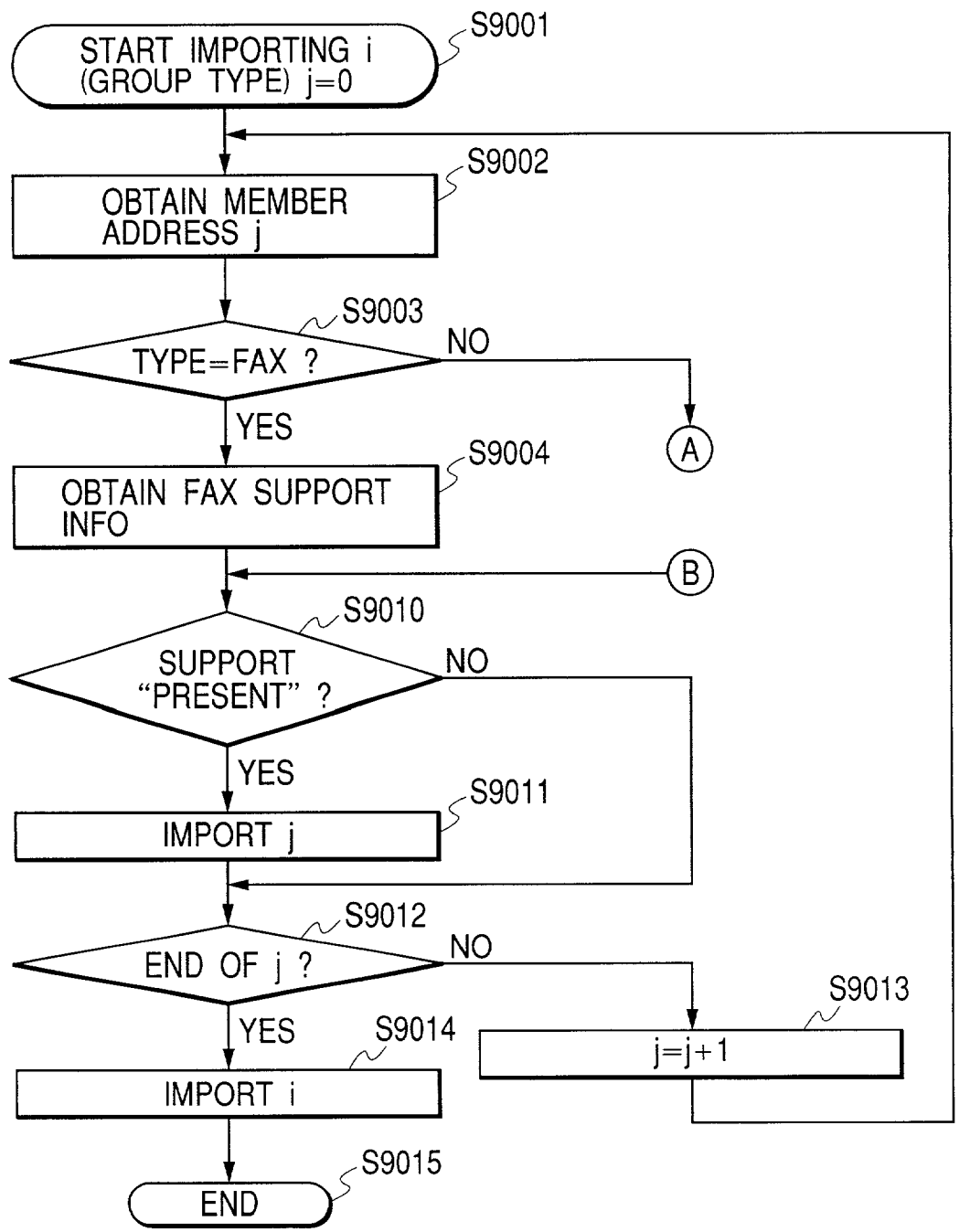
FIGS. 10A and 10B are flow charts showing an importing process in the second embodiment, in case the address information to be subjected to the importing process is a group.

Then a step S7003 discriminates whether the type of the address i is a group, and, if not, the sequence proceeds to a step S8001 in FIG. 9, but, if it is a group, the sequence proceeds to a step S9001 in FIG. 10A.

After the process on the address i in the aforementioned steps, the sequence proceeds to a step S9004 either through a step S8011 in FIG. 9 in case the address i is not a group, or through a step S9015 in FIG. 10A in case the address i is a group.

A step S7004 discriminates whether all the addresses have been processed, and, if any address has not been processed, the sequence proceeds to a step S7005 to add 1 to the address i and then returns to the step S7002 to continue the above-described procedure. On the other hand, if all the addresses have been processed, the sequence proceeds to a step S7006 to terminate the importing process.

FIG. 9 is a flow chart showing the importing process in case the address i constituting the object of importation is not a group.

If the address i is not a group, the address management component 3002 initiates the importing process for the address i in a step S8001. Then a step S8002 discriminates whether the type of the address i is facsimile, and, if so, the sequence proceeds to a step S8003 for obtaining facsimile supporting information from the transmission management component 3003.

On the other hand, if the type of the address i is not facsimile, the sequence proceeds to a step S8004 for discriminating whether the type is database, and, if so, the sequence proceeds to a step S8005 for obtaining database supporting information from the transmission management component 3003.

If the type of the address i is not database, the sequence proceeds to a step S8006 for discriminating whether the type is print, and, if so, the sequence proceeds to a step S8010 for obtaining print supporting information from the transmission management component 3003.

If the type of the address i is not print, the sequence proceeds to a step S8008 for obtaining e-mail/I-fax supporting information from the transmission management component 3003.

After the support information corresponding to the type of the address i is obtained, a step S8009 discriminates whether the obtained support information is "present", and, if present, the sequence proceeds to a step S8010 for importing the address i and then to a step S8011, but, in case of not present, the sequence proceeds to the step S8011 without importing the address i, thereby terminating the importing process for the address i.

Figure 10B:
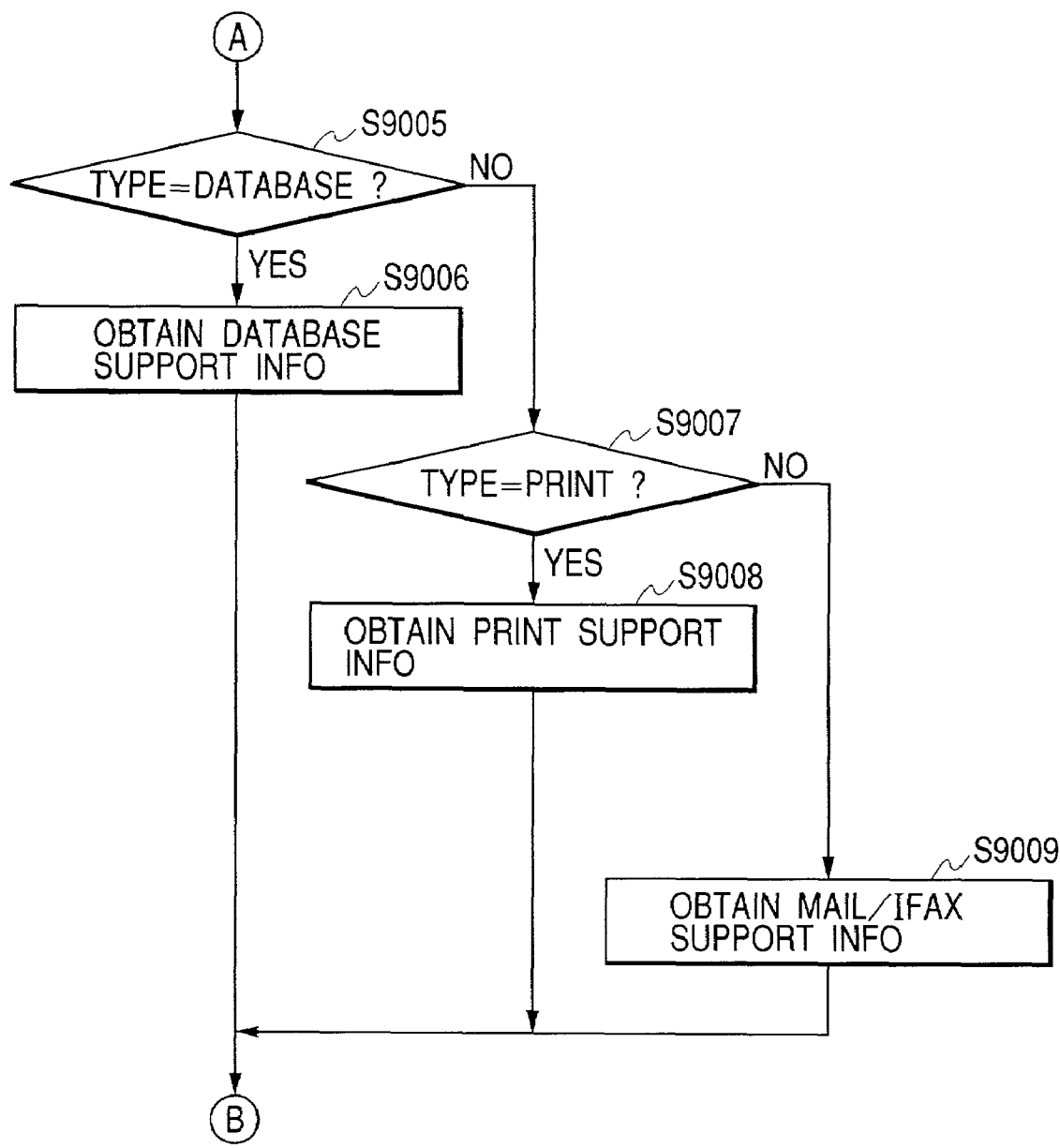

FIGS. 10A and 10B are flow charts showing the importing process in case the address i constituting the object of importation is a group.

If the address i is a group, the address management component 3002 initiates the importing process for the address i by setting i=0 in a step S8001. Then a step S8002 obtains a member address j.

Then a step S9003 discriminates whether the type of the member address j is facsimile, and, if so, the sequence proceeds to a step S9004 for obtaining the facsimile supporting information from the transmission management component 3003.

On the other hand, if the type of the member address j is not facsimile, the sequence proceeds to a step S9005 in FIG. 10B for discriminating whether the type is database, and, if so, the sequence proceeds to a step S9006 for obtaining database supporting information from the transmission management component 3003.

If the type of the member address j is not database, the sequence proceeds to a step S9007 for discriminating whether the type is print, and, if so, the sequence proceeds to a step S9008 for obtaining print supporting information from the transmission management component 3003.

If the type of the member address j is not print, the sequence proceeds to a step S9009 for obtaining e-mail/I-fax supporting information from the transmission management component 3003.

After the support information corresponding to the type of the member address j is obtained, a step S9009 discriminates whether the obtained support information is "present", and, if present, the sequence proceeds to a step S9011 for importing the member address j and then to a step S9012, but, in case of not present, the sequence proceeds to the step S9012 without importing the member address j.

A step S9012 discriminates whether all the member addresses have been processed, and, if any member address has not been processed, the sequence proceeds to a step S9013 for adding 1 to j and the sequence returns to the step S9002 to continue the above-described sequence.

If all the member addresses have been processed, the sequence proceeds to a step S9014 for importing the group address i and then to a step S9015 for terminating the importing process for the address i.

In case the discriminating step S8009 in FIG. 9 or S9010 in FIG. 10A is ineffective for example because the transmission component corresponding to the address to be imported is not installed in the composite apparatus 4002, there may be preferably displayed a message indicating that the address is not imported because of the corresponding transmission component is ineffective.

Such message can be, for example, "Fax component is ineffective. The address of the fax is automatically deleted." Such message may be displayed when the importation of all the address information is completed (step S7006 in FIG. 8), or when the importation of a group address information is completed (step S9015 in FIG. 10A) or when the component corresponding to each address becomes identified as ineffective in the course of importation of the address information (step S8009 in FIG. 9 or S9010 in FIG. 10A).

FIG. 11 shows an example of change of the address management information in case the address management information obtained from the composite apparatus 4001 by exportation is imported into the composite apparatus 4002.

The address management information exported from the composite apparatus 4001 includes the fax and database addresses, but the composite apparatus 4002 does not support the fax and database functions, so that the address management information is so reconstructed as to exclude the fax and database addresses and the fax and database member addresses contained in the group address by the sequences shown in FIGS. 8, 9, 10A and 10B.

In the second embodiment, as explained in the foregoing, at the importation of the address information into the communication apparatus, there is discriminated the state of installation of the transmission component in the communication apparatus and the address information is imported after reconstruction according to the result of such discrimination. Particularly in case of importing group address information, there is discriminated, for each member address information constituting the group address information, whether the importing communication apparatus supports the data transmission means corresponding to such member address information, and the member address information corresponding to the supported data communication means is selectively imported.

It is therefore possible to optimize the address information to be imported, according to the component provided in the communication apparatus. It is thus rendered possible to prevent an error resulting from the absence of the corresponding component, when the user utilizes the imported address information.

The present invention is applicable also to various modifications other than the foregoing embodiments. For example, in the foregoing embodiments, the address information is not imported if the corresponding transmission component is ineffective, but it is also possible, as a variation, to import the address information together with a status indicating an unusable state, and to control in such a manner that the user cannot use the address information of the unusable status. In case the transmission component corresponding to such unusable address information thereafter becomes effective, such unusable status can be then canceled. In such variation, the address information that cannot be used because the corresponding transmission component is ineffective is rendered usable when such transmission component becomes effective, so that the procedure of re-importing the address information can be dispensed with.

Also the foregoing embodiments have been explained by a communication apparatus constructed as a composite apparatus provided with plural communication components, but such embodiments are likewise applicable to a system consisting of devices such as a host computer, a modem unit, a LAN unit etc. mutually connected through a predetermined interface.

OTHER EMBODIMENT

In the foregoing embodiments, there have been explained the data transmission in the facsimile job, print job, database job and e-mail/I-fax job, but there may naturally be included a transmission job for transmitting an image, read by the scanner 2070, to the client compute 1005 and a transmission job for transmitting the image, read by the scanner 2070, to the facsimile 1003.

Also the program for realizing the data transmission function including the address information display process explained in the foregoing embodiment is assumed to be stored in the HDD 2004, but the object of the present invention can naturally be attained also in a case where a memory medium storing the program codes of as software realizing such function is supplied to a system or an apparatus and a CPU of such system or apparatus reads and executes the program codes stored in the memory medium.

In such case, the program codes themselves read from the memory medium realize the functions of the aforementioned embodiments, and the memory medium storing the program codes constitutes the present invention. The memory medium for supplying the program codes can be, for example, a floppy disk, an optical disk, a magnetooptical disk, a CD-ROM, a CD-R, a magnetic tape, a non-volatile memory card or a ROM.

Furthermore, the present invention includes not only a case where the functions of the aforementioned embodiments are realized by the CPU through the execution of the read program codes, but also a case where an operating system (OS) or the like executes all the processes or a part thereof according to the instruction of the program codes thereby realizing the functions of the aforementioned embodiments.

Furthermore, the present invention includes a case where the program codes read from the memory medium are once stored in a memory provided in a function expansion board inserted into the apparatus or a function expansion unit connected thereto and a CPU or the like provided in such function expansion board or function expansion unit executes all the processes or a part thereof according to the instruction of the program codes, thereby realizing the functions of the aforementioned embodiments.

What is claimed is:

1. A communication apparatus for transmitting data comprising:
    a transmitting unit adapted to transmit data and capable of executing one of plural types of transmitting operations;
    a management unit adapted to manage and import, from an external device, address management information managed in the external device;
    an obtaining unit adapted to obtain the transmission destination based on the address information included in the address management information; and
    a control unit adapted to control said transmitting unit so as to transmit data to the transmission destination obtained by the obtaining unit using one of the plural types of transmitting operations corresponding to the transmission destination;

wherein said management unit imports the plurality of address information corresponding to predetermined type of transmitting operation included in the plurality of transmitting operations in a case where the predetermined type of transmitting operation is in a state available for the communication apparatus, and wherein said management unit does not import the plurality of address information corresponding to the predetermined type of transmitting operation in a case where the predetermined type of transmitting operation is not in the state available for the communication apparatus.

2. An apparatus according to claim 1, further comprising a display unit adapted to display a message in a case where the predetermined type of transmitting operation is not available for the communication apparatus.

3. A communication apparatus for transmitting data, comprising:

a transmitting unit adapted to transmit data and capable of executing one of plural types of transmitting operations;

a management unit adapted to manage address management information in which plural address information are made correspondent to each of the plural types of transmitting operations, the address information being information for designating a transmission destination;

an obtaining unit adapted to obtain the transmission destination based on the address information included in the address management information;

a control unit adapted to control said transmitting unit so as to transmit data to the transmission destination obtained by the obtaining unit using one of the plural types of transmitting operations corresponding to the transmission destination; and a discriminating unit adapted to discriminate whether each of the plurality of transmitting operations is in a state available for the communication apparatus or not, wherein said obtaining unit can obtain predetermined address information stored in a storage unit to which predetermined type of transmitting operation included in the plural types of transmitting operations corresponds, in a case where said discriminating unit discriminates that the predetermined type of transmitting operation is in the state available for the communication apparatus, and wherein said obtaining unit can not obtain the predetermined address information stored in the storage unit to which the predetermined type of transmitting operation corresponds, in a case where said discriminating unit discriminates that the predetermined type of transmitting operation is not in the state available for the communication apparatus.

4. An apparatus according to claim 3, wherein the plural types of transmitting operations includes at least one of a facsimile transmitting operation for transmitting facsimile data via a public network and a network transmitting operation for transmitting data via a network.

5. An apparatus according to claim 3, further comprising a display unit adapted to display the address information so as to allow said obtaining unit to obtain the transmission destination, wherein said display unit displays predetermined type of address information stored in the storage unit to which predetermined type of transmitting operation corresponds in a case where said discriminating unit discriminates that the predetermined type of operation is in the state available for the communication apparatus, and wherein said display unit displays the predetermined type of address information stored in the storage unit to which predetermined type of transmitting operation corresponds in a case where said discriminating unit discriminates that the predetermined type of operation is not in the state available for the communication apparatus.

6. An apparatus according to claim 3, wherein said discriminating unit discriminates that the predetermined type of transmitting operation is not in the state available for the communication apparatus in a case where the device for executing the predetermined type of transmitting operation is absent.

7. An apparatus according to claim 3, wherein said discriminating unit discriminates that the predetermined transmitting operation is not available in a case where the device for executing the predetermined transmitting operation is out of order.

8. A communication method for transmitting data, comprising:

a transmitting step of transmitting data and capable of executing one of plural types of transmitting operation;

a management step of managing and importing, from an external device, address management information managed in the external device;

an obtaining step of obtaining the transmission destination based on the address information included in the address management information; and a control step of controlling said transmitting step so as to transmit data to the transmission destination obtained in said obtaining step using one of the plural types of transmitting operations corresponding to the transmission destination;

wherein said management step imports the plurality of address information corresponding to predetermined type of transmitting operation included in the plurality of transmitting operations in a case where the predetermined type of transmitting operation is in a state available for said communication method, and wherein said management step does not import the plurality of address information corresponding to the predetermined type of transmitting operation in a case where the predetermined type of transmitting operation is not in the state available for said communication method.

9. A communication method for transmitting data, comprising:

a transmitting step of transmitting data and capable of executing one of plural types of transmitting operations;

a management step of managing address management information in which plural address information are made correspondent to each of the plural types of transmitting operations, the address information being information for designating a transmission destination;

an obtaining step of obtaining the transmission destination based on the address information included in the address management information;

a control step of controlling said transmitting step so as to transmit data to the transmission destination obtained in said obtaining step using one of the plural types of transmitting operations corresponding to the transmission destination; and a discriminating step of discriminating whether each of the plurality of transmitting operations is in a state available for said communication method or not, wherein said obtaining step can obtain predetermined address information stored in a storage unit to which predetermined type of transmitting operation included in the plural types of transmitting operations corresponds, in a case where said discriminating step discriminates that the predetermined type of transmitting operation is in the state available for said communication method, and wherein said obtaining step can not obtain the predetermined address information stored in the storage unit to which the predetermined type of transmitting operation corresponds in a case where said discriminating step discriminates that the predetermined type of transmitting operation is not in the state available for said communication method.

* * * * *

UNITED STATES PATENT AND TRADEMARK OFFICE
CERTIFICATE OF CORRECTION

PATENT NO. : 7,256,905 B2  
APPLICATION NO. : 09/875983  
DATED : August 14, 2007  
INVENTOR(S) : Hiroshi Uchikawa Page 1 of 1

It is certified that error appears in the above-identified patent and that said Letters Patent is hereby corrected as shown below:

COLUMN 1:

Line 22, "includes" should read --include--.

COLUMN 5:

Line 18, "HHDD 2004" should read --HDD 2004--.

COLUMN 7:

Line 45, "receives" should read --received--.

COLUMN 15:

Line 49, "can not" should read --cannot--; and  
Line 57, "includes" should read --include--.

COLUMN 18:

Line 1, "can not" should read --cannot--.

Signed and Sealed this

Twenty-ninth Day of April, 2008

JON W. DUDAS  
*Director of the United States Patent and Trademark Office*